(12) United States Patent
Renau

(10) Patent No.: US 6,850,850 B1
(45) Date of Patent: Feb. 1, 2005

(54) FLUID FILTER FLOWMETER SELF-GENERATING POWER SOURCE SYSTEM AND METHOD

(75) Inventor: Karol Renau, Calabasas, CA (US)

(73) Assignee: Renau Corporation, Chatsworth, CA (US)

( * ) Notice: Subject to any disclaimer, the term of this patent is extended or adjusted under 35 U.S.C. 154(b) by 0 days.

(21) Appl. No.: 10/639,239

(22) Filed: Aug. 11, 2003

(51) Int. Cl.[7] .............................. G06F 9/00; G06F 1/00
(52) U.S. Cl. .................. 702/45; 73/168; 73/861.12; 210/137
(58) Field of Search .............................. 702/45, 49, 50, 702/100; 73/861.08, 861.12, 861.78; 210/87, 91, 137, 232, 767; 324/71.1

(56) References Cited

U.S. PATENT DOCUMENTS

| | | | | |
|---|---|---|---|---|
| 3,973,194 A | * | 8/1976 | McMorris et al. | 324/71.1 |
| 4,469,596 A | * | 9/1984 | Kantor | 210/137 |
| 5,325,728 A | * | 7/1994 | Zimmerman et al. | 73/861.12 |
| 6,619,112 B2 | * | 9/2003 | Juhasz | 73/168 |

* cited by examiner

Primary Examiner—John Barlow
Assistant Examiner—John Le
(74) Attorney, Agent, or Firm—Fulwider Patton Lee & Utecht, LLP

(57) ABSTRACT

A flowmeter for metering the volume of flow of a fluid through a filter, to enable the level of filter usage to be indicated. A preset level of metered fluid flow volume indicates a corresponding level of filter usage. The flowmeter is able to self-generate current responsive to the flow of the fluid therethrough.

34 Claims, 3 Drawing Sheets

US 6,850,850 B1

FLUID FILTER FLOWMETER SELF-GENERATING POWER SOURCE SYSTEM AND METHOD

BACKGROUND OF THE INVENTION

1. Field of the Invention

The present invention relates generally to flowmeters, for metering the flow of a fluid through a filter, to enable the level of fluid usage to be indicated, and, more particularly, relates to a flowmeter for self-generating current therefor responsive to the flow of fluid therethrough.

2. Description of the Related Art

A filter is able to filter a fluid such as water, in a counter-top faucet fixture system. After use of the filter for a period of time, the filter should be replaced. A flowmeter is able to provide an indication of the extent of filter usage, so that the user may be aware of the need to replace the filter. A source of current, such as a battery, is integrated into the flowmeter, to enable the flowmeter to function. It is desirable to enable the flowmeter to self generate current, for enabling the functioning thereof for long periods of time, without requiring replacement of a current source such as a battery when the filter is replaced.

Therefore, there has existed a need for a system which is capable of self generating current, for enabling the operation of the flowmeter. The present invention fulfills these needs.

SUMMARY OF THE INVENTION

Briefly, and in general terms, the present invention provides the metering of the volume of flow of a fluid through a filter, to enable the level of filter usage to be indicated. A preset level of metered fluid flow volume indicates a corresponding level of filter usage. A source of the fluid is able to be connectable to the filter, to enable the fluid to flow through the filter and through the system. The system is able to self-generate current therefor responsive to the flow of the fluid therethrough.

The system includes a flow volume processing element, for processing the volume of fluid flow over time to determine the level of filter usage, and current-inducing element, for inducing current responsive to the flow of the fluid. It further includes a current-generating element, for generating current including electrical charge responsive to the current induced therein by the interaction thereof with the current-inducing element, so as to self-generate current responsive to the fluid flow and the interaction of the current-inducing element therewith. Also, the system includes a storing element, for storing the electrical charge generated by the interaction of the current-inducing element and the current-generating element so as to charge the storing element, able to generate current from the electrical charge stored therein for activating the flow volume processing element. It also includes a discharging element, for enabling the current in the flow volume processing element to discharge therethrough.

Upon each interaction of the current-inducing element and the current-generating element, the metering system sequences through a metering cycle whereby the storing element charges. The current generated in the storing element activates the flow volume processing element such that the flow volume processing element starts up, operates, and calculates and stores the volume of fluid flow. The current from the flow volume processing element discharges through the discharging element such that the flow volume processing element shuts down.

Other features and advantages will become apparent from the following detailed description, taken in conjunction with the accompanying drawings, which describe and illustrate, by way of example, the features of the invention.

DETAILED DESCRIPTION OF THE PREFERRED EMBODIMENTS

Figures 1, 2:
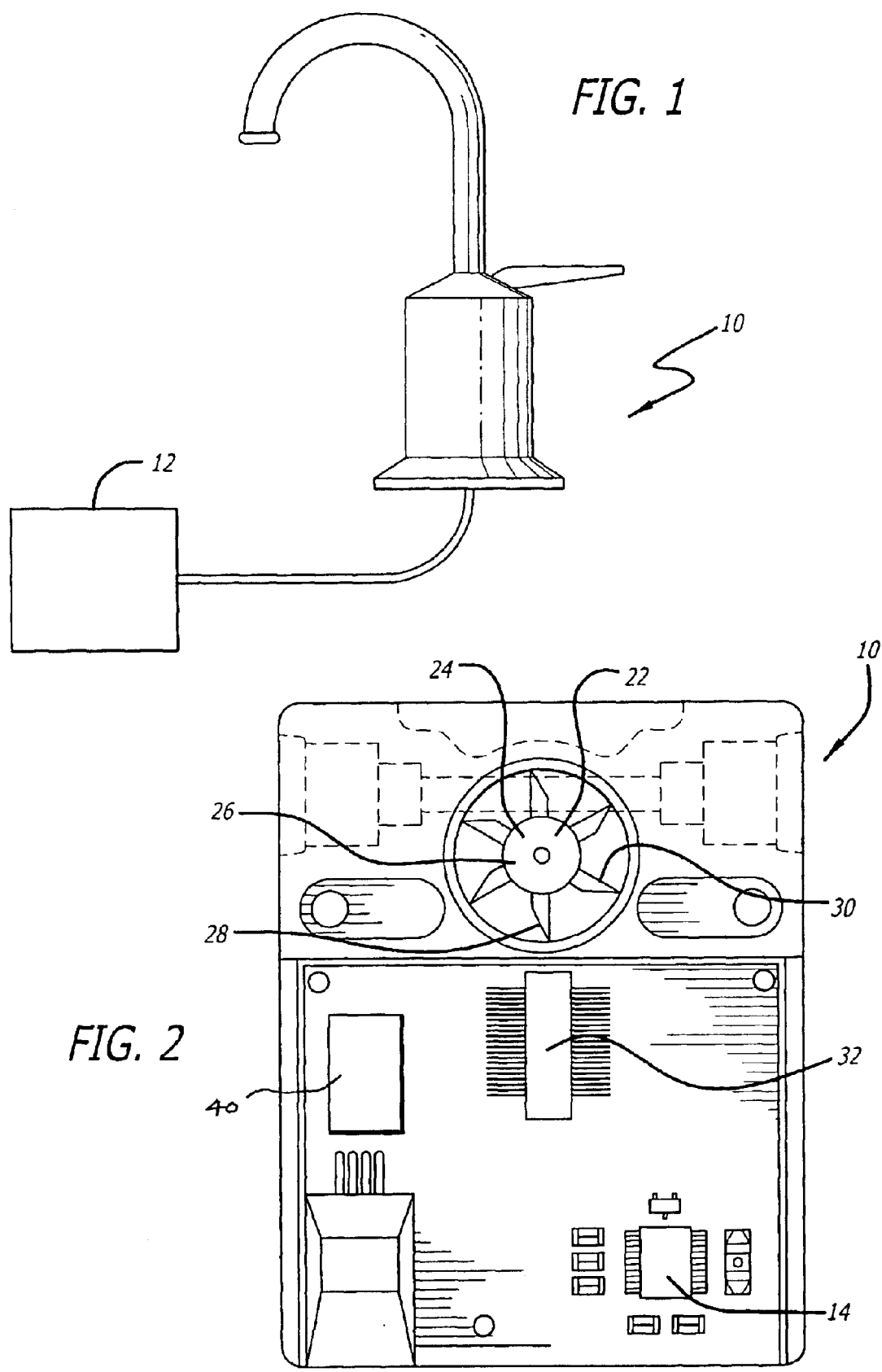
FIG. 1 is a partly-elevational view of a counter-top faucet, a flowmeter, and a filter system in accordance with the present invention.
FIG. 2 is a top plan view of internal elements of a flowmeter in accordance with the present invention.
Figure 3:
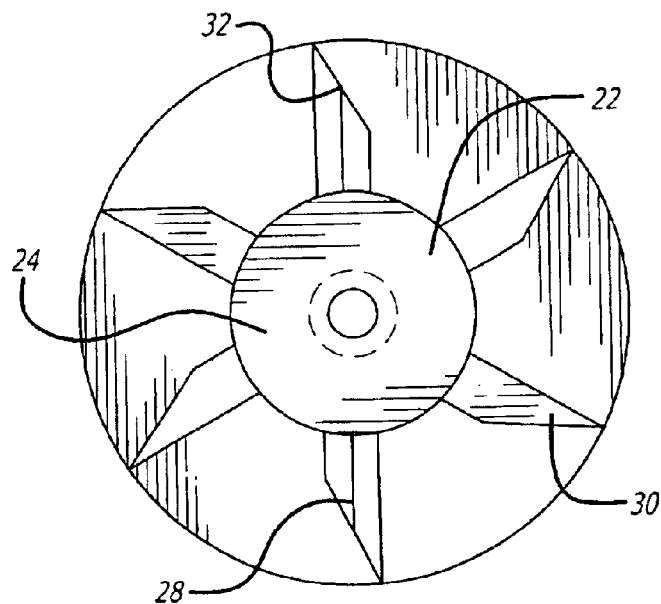
FIG. 3 is a top plan view of an impeller in accordance with the present invention.
Figure 4:
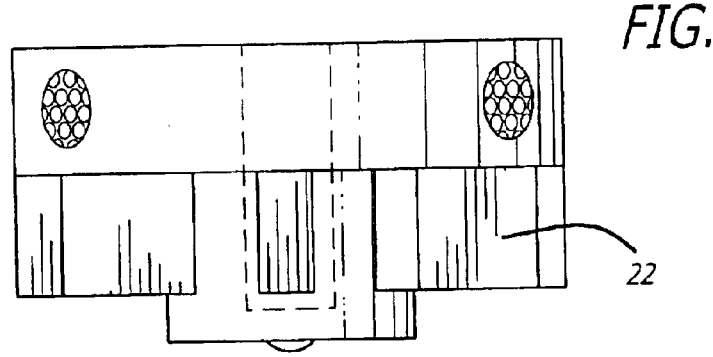
FIG. 4 is an elevational view of an impeller in accordance with the present invention.
Figure 5:
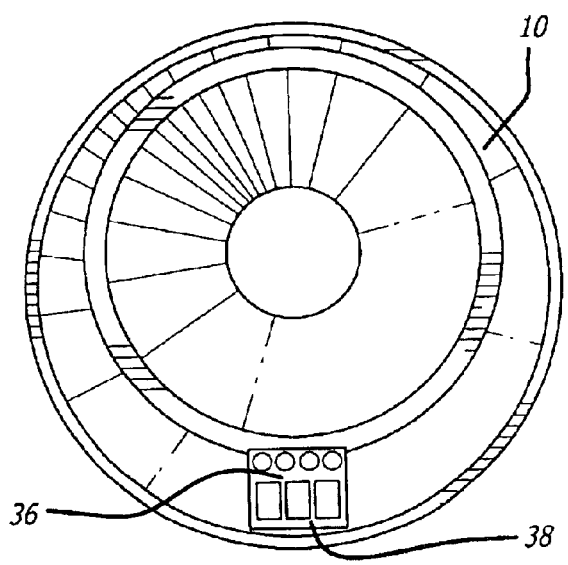
FIG. 5 is a top plan view of the base of the faucet and the flowmeter indicator in accordance with the present invention.
Figure 6:
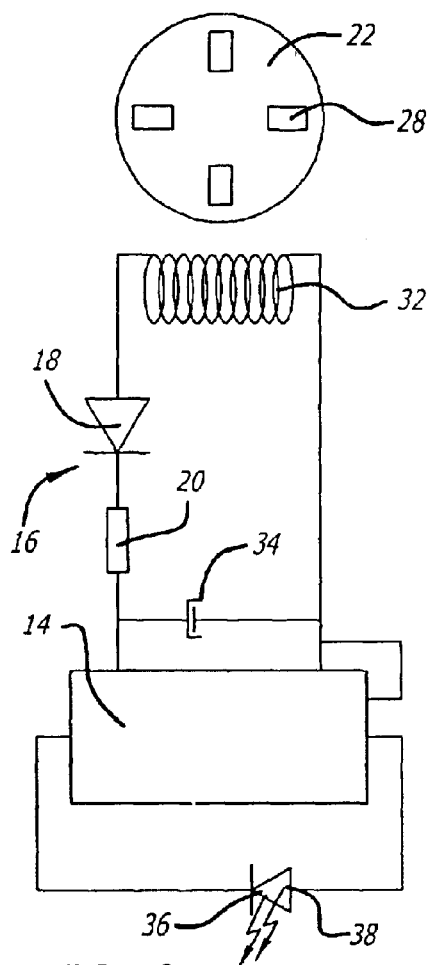
FIG. 6 is a circuit diagram of the flowmeter circuit in accordance with the present invention.
Figure 7:
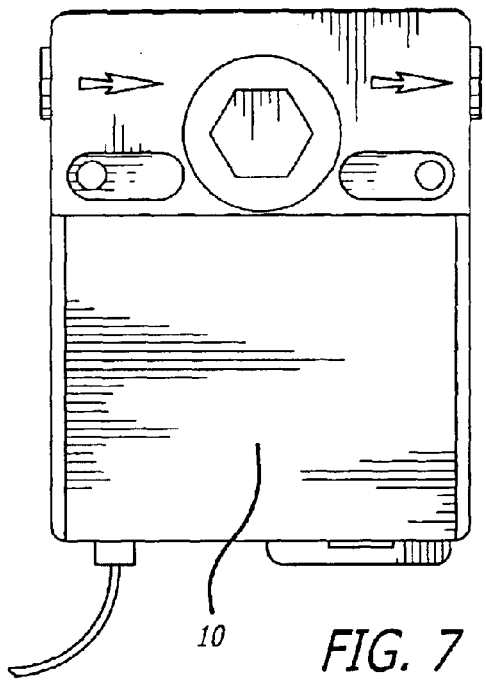
FIG. 7 is a top plan view of the flowmeter in accordance with the present invention.

Referring to the drawings, and in particular to FIGS. 1–7, there is shown a system 10 for metering the volume of flow of a fluid through a filter 12, to enable the level of filter usage to be indicated. A preset level of metered fluid flow volume indicates a corresponding level of filter usage. A source of the fluid is able to be connectable to the filter 12, to enable the fluid to flow through the filter 12 and through the system 10. The system 10 is able to self-generate current for the system 10 responsive to the flow of the fluid therethrough. The fluid may comprise water. The system 10 may be compact in size, and may be utilized for example in water filtering systems or coffee filter machines.

The system 10 includes a flow volume processing element 14, for processing the volume of the flow of the fluid over time to determine the level of filter usage. The flow volume processing element 14 may comprise a microprocessor. It is able to compare the determined level of filter usage to a preset level of filter usage. The flow volume processing element 14 is able to read very rapidly the information regarding water flow. It further may comprise an electronically activating element 16, for enabling electronic activation thereof. The electronically activating element may include a diode 18 and a resistor 20.

Further, the system includes a current-inducing element 22, for inducing current responsive to the flow of the fluid. The current-inducing element 22 may comprise an impeller 24, which includes a rotor 26 comprising a plurality of blades 28 extending radially therein. The impeller 26 is able to be positionable transverse to the path of the flow of the fluid through the system 10, such that the flow of fluid through the system 10 generates rotation of the rotor 26 in the impeller 24. It further includes at least one magnet 30 mounted in at least one blade 28 thereof. The impeller magnet 30 may comprise a plurality of magnets 30, each mounted in one of the plurality of blades 28 in the impeller 24. The plurality of magnets 30 extend radially on the impeller rotor blades 28. The plurality of magnets 30 may comprise four magnets 30, for enabling more energy to be generated, and the plurality of blades 28 in which each of the four magnets 30 is mounted may comprise four blades 28.

The system also includes a current-generating element 32, for generating current including electrical charge responsive to the current induced therein by the interaction thereof with the current-inducing element 22, so as to self-generate current responsive to the fluid flow and the interaction of the current-inducing element 22 therewith. The current-generating element 32 may comprise a coil.

The system further includes a storing element 34, for storing the electrical charge generated by the interaction of the current-inducing element 22 and the current-generating element 32 so as to charge the storing element 34. The storing element 34 is able to generate current from the electrical charge stored therein, for activating the flow volume processing element 14. The storing element 34 may comprise a capacitor. The diode 18 and the resistor 20 in the electronically activating element 16 of the flow volume processing element 14 may be connected to the storing element 34, the current-generating element 22, and the flow volume processing element 14.

Also, the system includes a discharging element 36, for enabling the current in the flow volume processing element 14 to discharge therethrough. The discharging element 36 may comprise a level indicating element 38 for emitting light to indicate the level of filter usage as determined by the flow volume processing element 14, so as to indicate the need for filter replacement. The level indicating element 38 may comprise a light-emitting diode. A non-volatile memory element 40 such as a flashcard enables the system 10 to retain data when the power is cut off.

Upon generating fluid through the system 10, the current-inducing element 22 and the current-generating element 32 immediately start interacting. For such interaction of the current-inducing element 22 and the current-generating element 32, the metering system 10 sequences through a metering cycle. In the metering cycle, the storing element 34 may charge, and the current generated in the storing element 34 may activate the flow volume processing element 14, which is normally in sleep mode, such that the flow volume processing element 14 may start up, operate, and calculate and store the volume of fluid flow. The current from the flow volume processing element 14 may discharge through the discharging element 36 such that the flow volume processing element 14 shuts down.

Figure 8:
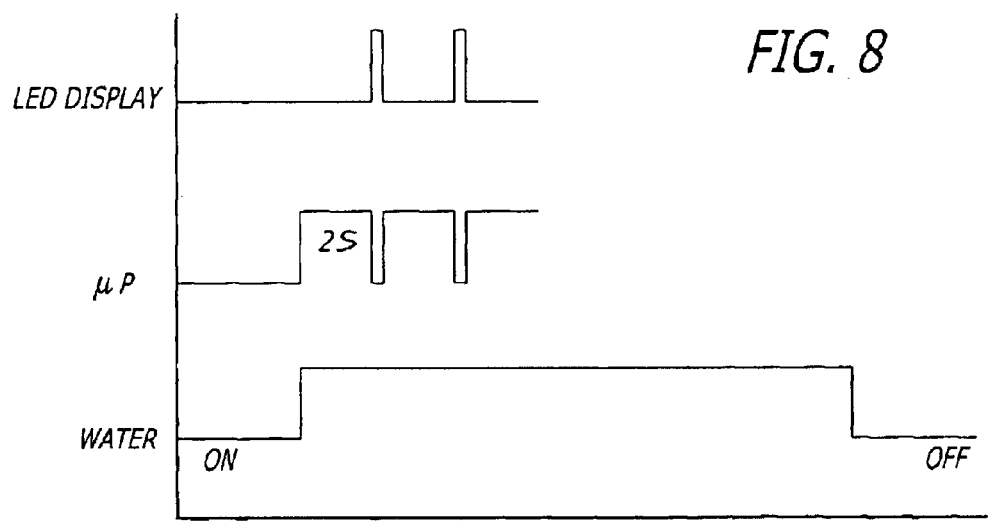
FIG. 8 includes graphs of the operation of elements of the flowmeter over time in accordance with the present invention.

As illustrated in FIGS. 1–8, in a method for use of the system 10, current is induced in the current-inducing element 22 responsive to the flow of the fluid such as water through the system 10 which may constitute a compact system. Current may be induced by generating rotation of the rotor 26 in the impeller 24, including generating rotation of the plurality of magnets 30 mounted in the plurality of blades 28 in the rotor 26, wherein the plurality of magnets 30 extend radially on the impeller rotor blades 28. Inducing current may comprise generating rotation of the four magnets 30 mounted on the four blades 28 of the impeller rotor 26. Current including electrical charge is generated in the current-generating element 32 responsive to the current induced by the interaction of the current-inducing element 22 and the current-generating element 32. The alternating-current energy pulses generated in the current-generating element 32 are rectified to direct current in the diode 18. Electrical charge generated by the interaction of the current-inducing element 22 and the current-generating element 32 is stored in the storing element 34 which may comprise a capacitor. Current which is generated from the electrical charge generated in the current-generating element 32 which may comprise a coil is stored in the storing element 34.

The flow volume processing element 14 is activated by the current generated in the storing element 34, such that at the same time the storing element 34 is storing energy, the flow volume processing element 14 is awakened and starts counting data regarding how many pulses it is getting. The volume of the flow of the fluid over time is processed to determine the level of filter usage, in the flow volume processing element 14, which may comprise a microprocessor. Processing may comprise comparing the determined level of filter usage to a preset level of filter usage in the microprocessor 14. The current from the flow volume processing element 14 is discharged through the discharging element 36, which may comprise a level indicating element 38 such as a light emitting diode, shorting the storing element 34 through the discharging element 36. There is enough energy in the flow volume processing element 14 in about two seconds time to enable the display of the information in the level indicating element 38, whereupon the flow volume processing element 14 stops counting pulses for the protection of the flow volume processing element 14. All of the energy is discharged through the discharging element 36 in a very short time, whereupon the stored energy starts the flow volume processing element 14, and the cycle of counting pulses is repeated. In the repeated process, the level indicating element 38 may blink every two seconds. The faster the fluid flows, the faster the display by the level indicating element 38, and the slower the flow, the longer the display. The flow volume processing element 14 may be electronically activated, through a diode 18 and a resistor 20. When the filter 12 is changed, for example when the level indicating element 38 turns red to indicate that 800 gallons of fluid flowed therethrough, the system 10 may be reset by a software or hardware reset.

From the foregoing it will be appreciated that the system of the present invention provides advantages in self-generating current for metering the volume of fluid flow through a filter to enable the indicating of filter usage levels. While several particular forms of the invention have been illustrated and described, it will be apparent that various modification can be made without departing from the spirit and scope of the invention. Accordingly, the invention is not to be limited, except as by the following claims.

What is claimed is:

1. A system for metering the volume of flow of a fluid through a filter, to enable the level of filter usage, to be indicated, wherein a preset level of metered fluid flow volume indicates a corresponding level of filter usage, and wherein, in the system, a source of the fluid is adapted to be connectable to the filter, to enable the fluid to flow through the filter and through the system, and wherein the system is adapted to self-generate current for the system responsive to the flow of the fluid therethrough, comprising:

a flow volume processing element, for processing the volume of the flow of the fluid over time to determine the level of filter usage;

a current-inducing element, for inducing current responsive to the flow of the fluid;

a current-generating element, for generating current including electrical charge responsive to the current induced therein by the interaction thereof with the current-inducing element, so as to self-generate current responsive to the fluid flow and the interaction of the current-inducing element therewith;

a storing element, for storing the electrical charge generated by the interaction of the current-inducing element and the current-generating element so as to charge the storing element, adapted to generate current from the electrical charge stored therein for activating the flow volume processing element; and a discharging element, for enabling the current in the flow volume processing element to discharge therethrough;

wherein, upon each interaction of the current-inducing element and the current-generating element, the metering system sequences through a metering cycle whereby the storing element charges, the current generated in the storing element activates the flow volume processing element such that the flow volume processing element starts up, operates, and calculates and stores the volume of fluid flow, and the current from the flow volume processing element discharges through the discharging element such that the flow volume processing element shuts down.

2. The system of claim 1, wherein the discharging element comprises a level indicating element for emitting light to indicate the level of filter usage as determined by the flow volume processing element, so as to indicate the need for filter replacement.

3. The system of claim 1, wherein the fluid comprises water.

4. The system of claim 1, wherein the system is compact in size.

5. The system of claim 1, wherein the flow volume processing element comprises a microprocessor.

6. The system of claim 1, wherein the flow volume processing element is further adapted to compare the determined level of filter usage to a preset level of filter usage.

7. The system of claim 1, wherein the flow volume processing element further comprises an electronically activating element, for enabling electronic activation of the flow volume processing element.

8. The system of claim 7, wherein the electronically activating element includes a diode and a resistor, connected to the current-generating element, the storing element, and the flow volume processing element.

9. The system of claim 1, wherein the current-inducing element comprises an impeller, which includes a rotor comprising a plurality of blades extending radially therein, adapted to be positionable transverse to the path of the flow of the fluid through the system such that the flow of fluid through the system generates rotation of the rotor in the impeller, and further including at least one magnet mounted in at least one blade thereof.

10. The system of claim 9, wherein the impeller magnet comprises a plurality of magnets, each mounted in one of the plurality of blades in the impeller.

11. The system of claim 10, wherein the plurality of magnets extend radially on the impeller rotor blades.

12. The system of claim 10, wherein the plurality of magnets comprise four magnets, and the plurality of blades in which each of the four magnets is mounted comprise four blades.

13. The system of claim 1, wherein the current-generating element comprises a coil.

14. The system of claim 1, wherein the storing element comprises a capacitor.

15. The system of claim 1, further including a non-volatile memory element, adapted to retain stored data when power is cut off.

16. The system of claim 2, wherein the level indicating element comprises a light-emitting diode.

17. A system for metering the volume of flow of a fluid through a filter, to enable the level of filter usage to be indicated, wherein a preset level of metered fluid flow volume indicates a corresponding level of filter usage, and wherein, in the system, a source of the fluid is adapted to be connectable to the filter, to enable the fluid to flow through the filter and through the system, and wherein the system is adapted to self-generate current for the system responsive to the flow of the fluid therethrough, comprising:

flow volume processing means, for processing the volume of the flow of the fluid over time to determine the level of filter usage;

current-inducing means, for inducing current responsive to the flow of the fluid;

current-generating means, for generating current including electrical charge responsive to the current induced therein by the interaction thereof with the current-inducing means, so as to self-generate current responsive to the fluid flow and the interaction of the current-inducing means therewith;

storing means, for storing the electrical charge generated by the interaction of the current-inducing means and the current-generating means so as to charge the storing means, adapted to generate current from the electrical charge stored therein for activating the flow volume processing means; and discharging means, for enabling the current in the flow volume processing means to discharge therethrough;

wherein, upon each interaction of the current-inducing means and the current-generating means, the metering system sequences through a metering cycle whereby the storing element charges, the current generated in the storing means activates the flow volume processing means such that the flow volume processing means starts up, operates, and calculates and stores the volume of fluid flow, and the current from the flow volume processing means discharges through the discharging means such that the flow volume processing means shuts down.

18. A method of metering the volume of flow of a fluid through a filter, to enable the level of filter usage to be indicated, wherein a preset level of metered fluid flow volume indicates a corresponding level of filter usage, and wherein a source of the fluid is adapted to be connectable to the filter, to enable the fluid to flow through the filter and through the system, and wherein the system is adapted to self-generate current for the system responsive to the flow of the fluid therethrough, in a system which comprises a flow volume processing element, for processing the volume of the flow of the fluid over time to determine the level of filter usage, a current-inducing element, for inducing current responsive to the flow of the fluid, a current-generating element, for generating current including electrical charge responsive to the current induced therein by the interaction thereof with the current-inducing element, so as to self-generate current responsive to the fluid flow and the interaction of the current-inducing element therewith, a storing element, for storing the electrical charge generated by the interaction of the current-inducing element and the current-generating element so as to charge the storing element, adapted to generate current from the electrical charge stored therein for activating the flow volume processing element, and a discharging element, for enabling the current in the flow volume processing element to discharge therethrough, wherein, upon each interaction of the current-inducing element and the current-generating element, the metering system sequences through a metering cycle whereby the storing element charges, the current generated in the storing element activates the flow volume processing element such that the flow volume, processing element starts up, and operates, calculates and stores the volume of fluid flow, and the current from the flow volume processing element discharges through the discharging element such that the flow volume processing element shuts down, wherein the method comprises:

inducing current in the current-inducing element responsive to the flow of the fluid through the system;

generating current including electrical charge in the current-generating element responsive to the current induced by the interaction of the current-inducing element and the current-generating element;

storing electrical charge generated by the interaction of the current-inducing element and the current-generating element in the storing element;

generating current from the electrical charge stored in the storing element;

activating the flow volume processing element by the current generated in the storing element;

processing the volume of the flow of the fluid over time to determine the level of filter usage, in the flow volume processing element; and discharging the current from the flow volume processing element through the discharging element.

19. The method of claim 18, wherein the discharging element comprises a level indicating element for emitting light to indicate the level of filter usage as determined by the flow volume processing element, so as to indicate the need for filter replacement, and wherein discharging further comprises discharging the current from the flow volume processing element through the level indicating element.

20. The method of claim 19, wherein the level indicating element comprises a light-emitting diode, and wherein discharging further comprises discharging the current from the flow volume processing element through the light emitting diode.

21. The method of claim 18, wherein the fluid comprises water, and wherein inducing further comprises inducing current responsive to the flow of water through the system.

22. The method of claim 18, wherein the system is compact in size, and wherein inducing further comprises inducing current responsive to the flow of fluid through the compact system.

23. The method of claim 18, wherein the flow volume processing element comprises a microprocessor, and wherein processing further comprises processing the volume of the flow of fluid over time in the microprocessor.

24. The method of claim 18, wherein the flow volume processing element is further adapted to compare the determined level of filter usage to a preset level of filter usage, and wherein processing further comprises comparing the determined level of filter usage to a preset level of filter usage in the microprocessor.

25. The method of claim 18, wherein the flow volume processing element further comprises an electronically activating element, for enabling electronic activation of the flow volume processing element, further comprising electronically activating the flow volume processing element.

26. The method of claim 25, wherein the electronically activating element includes a diode and a resistor, connected to the current-generating element, the storing element and the flow volume processing element, and wherein electronically activating further comprises electronically activating the flow volume processing element through the diode and the resistor.

27. The method of claim 18, wherein the current-inducing element comprises an impeller, which includes a rotor comprising a plurality of blades extending radially therein, adapted to be positionable transverse to the path of the flow of the fluid through the system such that the flow of fluid through the system generates rotation of the rotor in the impeller, and further including at least one magnet mounted in at least one blade thereof, and wherein inducing further comprises generating rotation of the rotor in the impeller.

28. The method of claim 27, wherein the impeller magnet comprises a plurality of magnets, each mounted in one of the plurality of blades in the impeller, and wherein inducing further comprises generating rotation of the plurality of magnets mounted in the plurality blades in the rotor.

29. The method of claim 28, wherein the plurality of magnets extend radially on the impeller rotor blades, and wherein inducing further comprises generating rotation of the plurality of magnets extending radially on the impeller rotor blades.

30. The method of claim 28, wherein the plurality of magnets comprise four magnets, and the plurality of blades in which each of the four magnets is mounted comprise four blades, and wherein inducing further comprises generating rotation of the four magnets mounted on the four blades.

31. The method of claim 18, wherein the current-generating element comprises a coil, and wherein generating current further comprises generating current in the coil.

32. The method of claim 18, wherein the storing element comprises a capacitor, and wherein storing further comprises storing the electrical charge in the capacitor.

33. The method of claim 18, further including a non-volatile memory element, adapted to retain stored data when power is cut off, further including retaining stored data in the non-volatile memory element when the power is cut off.

34. A method of metering the volume of flow of a fluid through a filter, to enable the level of filter usage to be indicated, wherein a preset level of metered fluid flow volume indicates a corresponding level of filter usage, and wherein a source of the fluid is adapted to be connectable to the filter, to enable the fluid to flow through the filter and through the system, and wherein the system is adapted to self-generate current for the system responsive to the flow of the fluid therethrough, in a system which comprises flow volume processing means, for processing the volume of the flow of the fluid over time to determine the level of filter usage, current-inducing means, for inducing current responsive to the flow of the fluid, current-generating means, for generating current including electrical charge responsive to the current induced therein by the interaction thereof with the current-inducing means, so as to self-generate current responsive to the fluid flow and the interaction of the current-inducing means therewith, storing means, for storing the electrical charge generated by the interaction of the current-inducing means and the current-generating means so as to charge the storing means, adapted to generate current from the electrical charge stored therein for activating the flow volume processing means, and discharging means, for enabling the current in the flow volume processing means to discharge therethrough, wherein, upon each interaction of the current-inducing means and the current-generating means, the metering system sequences through a metering cycle whereby the storing means charges, the current generated in the storing means activates the flow volume processing means, such that the flow volume processing means starts up, and operates, calculates and stores the volume of fluid flow, and the current from the flow volume processing means discharges through the discharging means such that the flow volume processing means shuts down, wherein the method comprises:

inducing current in the current-inducing means responsive to the flow of the fluid through the system;

generating current including electrical charge in the current-generating means responsive to the current induced by the interaction of the current-inducing means and the current-generating means;

storing electrical charge generated by the interaction of the current-inducing means and the current-generating means in the storing means;

generating current from the electrical charge stored in the storing means;

activating the flow volume processing means by the current generated in the storing means;

processing the volume of the flow of the fluid over time to determine the level of filter usage, in the flow volume processing means; and discharging the current from the flow volume processing means through the discharging means.

\* \* \* \* \*

UNITED STATES PATENT AND TRADEMARK OFFICE
CERTIFICATE OF CORRECTION

PATENT NO. : 6,850,850 B1 Page 1 of 1
DATED : February 1, 2005
INVENTOR(S) : Karol Renau It is certified that error appears in the above-identified patent and that said Letters Patent is hereby corrected as shown below:

<u>Column 4,</u>
Line 48, delete "usage," and insert -- usage --.

<u>Column 7,</u>
Line 4, delete "volume," and insert -- volume --.

Signed and Sealed this

Fifth Day of July, 2005

JON W. DUDAS
*Director of the United States Patent and Trademark Office*